United States Patent [19]

Budde et al.

[11] 4,074,953

[45] Feb. 21, 1978

[54] SURFACE AERATOR

[75] Inventors: Antonius Wilhelmus Hermanus Budde, Ermelo; Johannes Bernardus Maria Wiggers, Hoevelaken, both of Netherlands

[73] Assignee: Ingenieursbureau Dwars, Heederik en Verhey B.V., Amersfoort, Netherlands

[21] Appl. No.: 738,174

[22] Filed: Nov. 2, 1976

[30] Foreign Application Priority Data

May 31, 1976 Netherlands .......................... 7605875

[51] Int. Cl.² ............................................... B01F 3/04
[52] U.S. Cl. ................................. 416/183; 416/186 R; 261/91
[58] Field of Search .................... 261/91, 93; 416/186, 416/183

[56] References Cited

U.S. PATENT DOCUMENTS

| 3,246,882 | 4/1966 | Clough | 261/91 X |
| 3,342,466 | 9/1967 | Flury | 261/91 |
| 3,421,745 | 1/1969 | Prupis | 261/91 X |
| 3,479,017 | 11/1969 | Thikotter | 416/186 X |
| 3,606,984 | 9/1971 | Robertson | 261/91 |
| 3,610,590 | 10/1971 | Kaelin | 416/186 X |
| 3,690,621 | 9/1972 | Tanaka et al. | 416/184 X |

FOREIGN PATENT DOCUMENTS 550,150  5/1958  Italy ..................................... 416/186

Primary Examiner—Everette A. Powell, Jr.
Attorney, Agent, or Firm—Haseltine, Lake & Waters

[57] ABSTRACT

A surface aerator equipped with a central vertical shaft which can be coupled to a drive means, substantially vertical blades being mounted on the lower end of said shaft.

According to the invention an upwardly expanding, smooth cone is fitted underneath, and coaxially with, the shaft, the greatest radius of which cone is appreciably greater than the radius of the shaft, but appreciably smaller than the radius of the aerator at the outer edges of the blades, while the upper edge of this cone is adjoined by an overhead vertical cylinder, the successive blades being linked by an outwardly and upwardly inclined, at least substantially flat connecting plate, which is upwardly staggered with respect to the cone.

8 Claims, 3 Drawing Figures

SURFACE AERATOR

BACKGROUND OF THE INVENTION

The invention relates to a surface aerator equipped with a central vertical shaft which can be coupled to a drive means, substantially vertical blades being mounted on the lower end of said shaft.

Surface aerators of this type are well known in the art and are rotated on the level of a surface of liquid so as to stir the liquid and aerate it by creating a large interfacial area between the air and the liquid. These surface aerators are frequently used in aerating tanks of activated sludge systems, where the tank may have the form of a rectangular vessel or of a closed circuit.

Surface aerators must satisfy a number of important demands if optimum effectiveness is to be achieved. First of all, they must be marked by a high oxygen input efficiency, which is defined as the number of kilograms of oxygen introduced per kWh consumed. This oxygen input efficiency must furthermore have a maximum of constancy over the range of depths of immersion and the range of speeds required for controlling the capacity. Moreover, the surface aerators must possess an output of capacity of maximum stability in service conditions as well as an adequate propelling capacity.

The known surface aerators often have the drawback of insufficiently meeting all of the aforementioned demands and, specifically, of lacking a high oxygen input efficiency.

SUMMARY OF THE INVENTION

It is an object of the present invention to provide a surface aerator of the above-mentioned kind, which distinguishes itself highly favourably from the known surface aerators in the properties mentioned and which excels specifically in a high oxygen input efficiency.

To this end, the surface aerator according to the invention is characterized in that an upwardly expanding, smooth cone is fitted underneath, and coaxially with, the shaft, the greatest radius of which cone is appreciably greater than the radius of the shaft, but appreciably smaller than the radius of the aerator at the outer edges of the blades, while the upper edge of this cone is adjoined by an overhead vertical cylinder, the successive blades being linked by an outwardly and upwardly inclined, at least substantially flat connecting plate, which is upwardly staggered with respect to the cone.

When the surface aerator according to the invention is rotated about the vertical shaft, the liquid will flow outwardly along the cone and along the vertical blades, great turbulence being imparted to this liquid by the outer blade portions on the level of the liquid surface, thus also producing great turbulence over a wide area at the liquid surface. This results in a large interfacial area being formed between the air and the liquid, thus causing oxygen to be introduced into the liquid.

Since the surface aerator according to the invention can be approached by liquid vertically from below over a wide area, whereafter the liquid is gradually deflected in a more or less horizontal direction, the losses of afflux energy are restricted to a minimum. Furthermore, the blades in the central portion of the surface aerator according to the invention have been inactivated by the cone, which is especially favourable, since any turbulence caused by these blade portions would at any rate be without significance because of the absence of contact with free air for aeration, but would nevertheless require additional power. A particularly favourable oxygen input efficiency is thus attained.

The use of the vertical cylinder as well as of the flat connecting plates which are upwardly staggered with respect to the cone leads to a blade form that produces a virtually constant oxygen input efficiency over the ranges of immersion depths and rotational speeds required for capacity control, while a highly stable power output is achieved as well.

Although the available blade surface in the central portion of the surface aerator is naturally reduced by the use of the cone, the invention nevertheless allows an especially large effective blade surface to be obtained, thus ensuring an outstanding stirring effect and an adequate propelling capacity of the surface aerator.

The inner edge of each blade is preferably fitted to the shaft, while the lower edge of the blade portion located outside the cone adjoins this cone at the location of the greatest radius thereof.

The connecting plates may extend inside as well as outside the vertical cylinder, and may be connected to the upper edge of this cylinder.

In certain conditions it can be useful to form behind at least a number of the blades — viewed in the direction of rotation — an opening in the vertical cylinder.

As a result of these openings, the oxygen input efficiency increases upon the change-over from the average depth of immersion to a minimum depth of immersion, which can sometime be favourable.

BRIEF DESCRIPTION OF THE DRAWINGS

The invention will hereinafter be explained with reference to the drawing, which illustrates an example of the surface aerator according to the invention.

DESCRIPTION OF A PREFERRED EMBODIMENT

Figure 1:
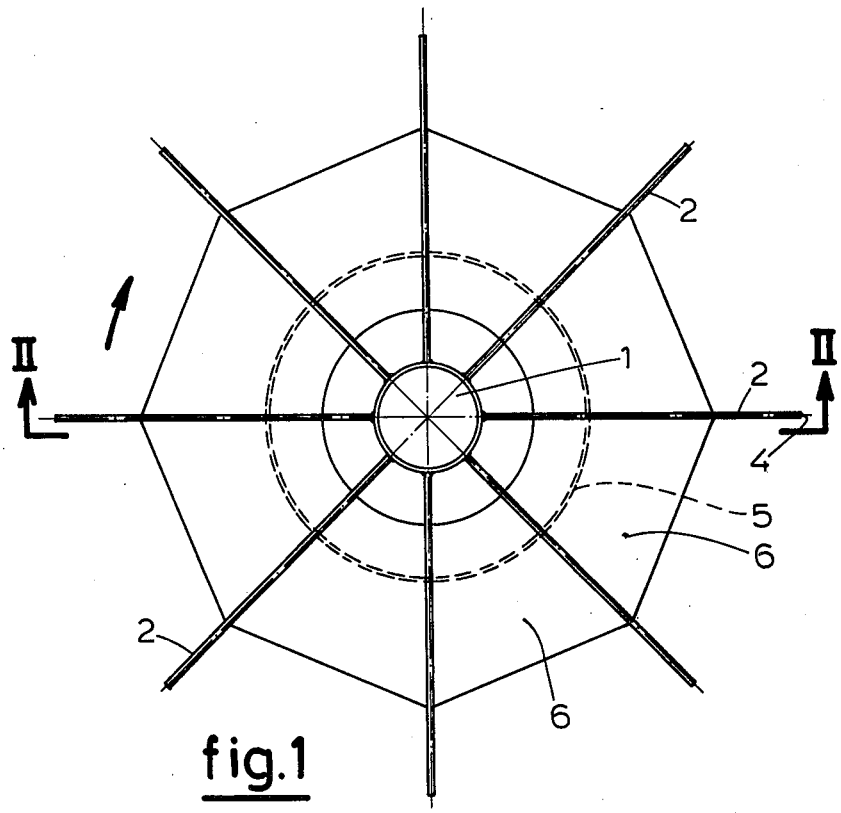
FIG. 1 is a top view of an embodiment of a surface aerator according to the invention.

The drawing illustrates an example of a surface aerator according to the invention. This surface aerator comprises a central vertical shaft 1, which can be coupled in a known manner to a drive element (not shown). A number of vertical blades 2, distributed along the periphery, are fitted to the lower portion of this shaft 1. These blades 2 are arranged radially in the embodiment shown, but as an alternative it is also possible to use blades which are arranged tangentially with respect to the shaft 1.

An upwardly expanding, smooth cone 3 is fixed coaxially with the shaft 1 beneath this shaft 1.

The greatest radius of this cone 3 is appreciably greater than the radius of the shaft 1, but, on the other hand, appreciably smaller than the radius of the aerator at the location of the vertical outer edges 4 of the blades 2.

The upper edge of the cone 3 is adjoined by an overhead vertical cylinder 5.

Successive blades 2 are linked by an outwardly and upwardly inclined, smooth connecting plate 6, which is upwardly staggered with respect to the cone 3.

Figure 2:
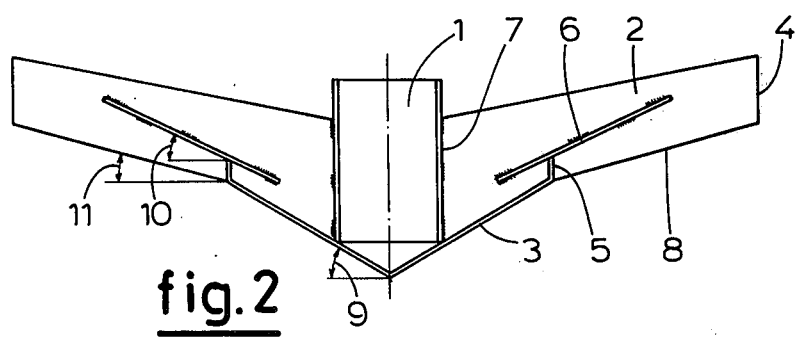
FIG. 2 is a vertical section along the plane II—II in FIG. 1.
Figure 3:
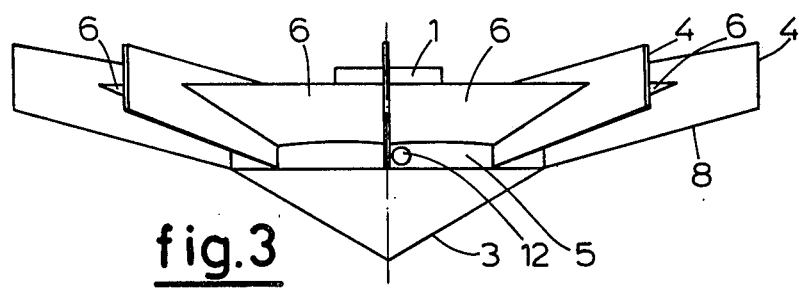
FIG. 3 is a lateral view of the surface aerator according to FIG. 1.

As shown in FIG. 2, the inner edge 7 of each blade 2 is welded to the shaft 1, while the lower edge 8 of the blade portion which lies outside the cone 3 adjoins the cone 3 at the location of the greatest radius thereof.

The connecting plates 6 extend both inside and outside the vertical cylinder 5 and are connected to the upper edge of this cylinder 5.

The connecting plates 6 end at an ample distance from the outside edge 4 of the blades 2. As a result, the liquid which flows outwardly below these connecting plates 6 can freely flow upwardly and can be better distributed over the water surface, which is favourable for the oxygen input efficiency. This also improves the stirring action of the surface aerator, since a large blade surface becomes available at an effective location.

Tests have demonstrated that optimum results are obtained with a surface aerator of which the greatest radius of the cone 3 amounts approximately to 43 percent of the radius of the aerator at the location of the outer edges 4 of the blades 2.

The generating lines of the cone 3 of this surface aerator furthermore enclose an angle 9 of approximately 30. deg. with respect to the horizontal plane. On account of this relatively wide angle 9, the deflection of the liquid from the vertical afflux direction to the substantially horizontal direction proceeds very gradually.

Furthermore, the connecting plates 6 enclose an angle 10 preferably amounting to approximately 25° with respect to the horizontal plane, i.e., a smaller angle than the angle 9, which is enclosed by the generating lines of the cone 3 with respect to the horizontal plane. This tends to stimulate the gradual deflection of the liquid even more.

The angle 11, enclosed by the lower edges 8 of the blades 2 with respect to the horizontal plane, is in turn smaller again than the angle 10 enclosed by the connecting plates 6 with respect to the horizontal plane. This angle 11 can advantageously amount to approximately 15°. As a result, the lower edges 8 of the blades 2 diverge outwardly with respect to the connecting plates 6, which is favourable in view of the fact that a better guide for the liquid is thus achieved.

An opening 12 can be formed in the vertical cylinder 5 behind a number of blades 2, viewed in the direction of rotation, which may be done, for example, behind all of the blades 2. Providing these openings 12 has the result that the oxygen input efficiency increases upon a change-over from an average depth of immersion to a minimum depth of immersion. This can be favourable in certain conditions.

According to the invention, a surface aerator is provided which possesses an especially high oxygen input efficiency that is very constant over the ranges of depths of immersion and rotational speeds required for controlling the capacity.

The surface aerator according to the invention moreover possesses a stable power output and an adequate propelling capacity.

In addition, the surface aerator according to the invention has been so designed as to avoid any risk of clogging or fouling, while its construction is very sturdy, thus ensuring a long service life.

The invention is not restricted to the example shown in the drawing, which can be varied in a number of manners within the scope of the appended claims.

We claim:

1. A surface aerator apparatus employing a central vertical shaft coupled to drive means; substantially vertical blades being mounted on a lower end of the shaft; an upwardly expanding, smooth conically shaped member disposed underneath, and coaxially with, said shaft; wherein: said conically shaped member having its greatest radius appreciably greater than the radius of said shaft, but appreciably smaller than the radius of said apparatus at outside edges of said blades, said conically shaped member being further defined at an upper edge by an adjoining overhead vertical cylinder; said blades being successively linked by outwardly and upwardly inclined flat connecting plates, being upwardly staggered with respect to said conically shaped member; each of said blades being fitted to said shaft, while lower edge portions of said blades located outside said conically shaped member being proximate thereto at the location of the greatest radius thereof; and said plates being disposed to extend both inside and outside said vertical cylinder and being affixed to said cylinder.

2. A surface aerator according to claim 1, wherein an opening is formed in the vertical cylinder behind at least a number of the blades.

3. A surface aerator according to claim 2, wherein the greatest radius of the cone amounts to approximately 43 percent of the radius of the aerator at the location of the outer edges of the blades.

4. A surface aerator according to claim 3, wherein the generating lines of the cone enclose an angle of approximately 30° with respect to the horizontal plane.

5. A surface aerator according to claim 4, wherein the connecting plates enclose a smaller angle with respect to the horizontal plane than is enclosed by the cone with respect to the horizontal plane.

6. A surface aerator according to claim 5, wherein the connecting plates enclose an angle of approximately 25° with respect to the horizontal plane.

7. A surface aerator according to claim 6, wherein the lower edges of the blades enclose a smaller angle with respect to the horizontal plane than is enclosed by the connecting plates with respect to the horizontal plane.

8. A surface aerator according to claim 7, wherein the lower edges of the blades enclose an angle of approximately 15° with respect to the horizontal plane.

* * * * *